United States Patent [19]

Iwata

[11] Patent Number: 5,289,159
[45] Date of Patent: Feb. 22, 1994

[54] AUTOMOBILE ALARM CIRCUIT RESPONSIVE TO MULTI-FREQUENCY PHENOMENA

[75] Inventor: Keisuke Iwata, Tokyo, Japan

[73] Assignee: Kabushiki Kaisha Iwata Electric, Tokyo, Japan

[21] Appl. No.: 869,394

[22] Filed: Apr. 16, 1992

[30] Foreign Application Priority Data

Nov. 28, 1991 [JP] Japan .................................. 3-105798

[51] Int. Cl.⁵ ............................................. B60R 25/10
[52] U.S. Cl. ............................... 340/429; 340/426; 340/566; 340/665; 340/683; 340/689
[58] Field of Search .............. 340/566, 689, 665, 683, 340/429, 426; 310/311

[56] References Cited

U.S. PATENT DOCUMENTS

| | | | |
|---|---|---|---|
| 4,307,387 | 12/1981 | Baxendale | 340/566 |
| 4,356,364 | 10/1982 | Soto | 340/429 |
| 4,636,775 | 1/1987 | Burgess et al. | 340/429 |
| 4,656,458 | 4/1987 | Iwata | 340/429 |
| 4,661,939 | 4/1987 | Braunling | 340/566 |
| 4,732,041 | 3/1988 | Iwata | 340/426 |
| 4,814,753 | 3/1989 | Coppola | 340/429 |
| 4,853,677 | 8/1989 | Yarbrough et al. | 340/566 |
| 4,972,713 | 11/1990 | Iwata | 340/429 |

*Primary Examiner*—Donnie L. Crosland
*Assistant Examiner*—Edward Lefkowitz
*Attorney, Agent, or Firm*—Bauer & Schaffer

[57] ABSTRACT

An automobile theft sensor has a piezo-electric element adhered at one side to a base member and which generates a voltage in response to vibration of the automobile body, a weight adhered to the opposite side of the piezo-electric element, a silicon rubber coating covering at least a portion of the surface of the piezo-electric element and weight, a low pass filter for receiving the output voltage of the piezo-electric element and for providing an ultra low frequency signal within the range of 1-5 Hz produced by the above mentioned piezo-electric element; and a band pass filter for receiving the output voltage of the piezo-electric element and for providing a low frequency bandpass signal centered on the 30-50 Hz produced by the above mentioned piezo-electric element in response to vibration of the above mentioned automobile body. When either of the filter outputs exceeds a predetermined level it is judged that theft or tampering is occurring.

2 Claims, 3 Drawing Sheets

AUTOMOBILE ALARM CIRCUIT RESPONSIVE TO MULTI-FREQUENCY PHENOMENA

FIELD OF THE INVENTION

The present invention relates to an automobile alarm for detecting the theft, and the like, of an automobile and in particular, to an alarm sensor which is mounted within the engine compartment, automobile interior, trunk, or the like, of an automobile, and which generates a signal in response to the detection of rocking movement and vibration of the automobile body that is typically associated with the theft of the automobile, the rocking and vibration caused by moving the automobile, the intrusion into the automobile compartment by a stranger, removal of the tire, breaking of the window glass and the insertion of the key into the keyhole of the door and the keyhole of the drunk and the like.

BACKGROUND OF THE INVENTION

Conventional automobile theft sensors are illustrated in FIG. 5 through FIG. 7. The sensor shown in FIG. 5 comprises a metal vibrating plate 2 supported on a base 1 at one end thereof, with a weight 3 attached to the other end of the metal vibrating plate 2. In accordance with shaking of the automobile body, the weight is caused to vertically oscillate along with the metal vibrating plate 2, which is made to come in contact with the fixed point of contact 4, forming a closed circuit. By detecting the closure of this circuit at the point of contact 4 a warning signal may be generated at the time of such contact.

The sensor illustrated in FIG. 6 comprises a metal ball 6 on a patterned base plate 5 having a fine electrical pattern etched thereon. When the automobile body rocks or tilts, the metal ball 6 rolls and generates intermittent signals while coming in contact with the etched electrical pattern. In this case, by detecting the intermittent signals, a warning signal may be generated at the time of theft of the automobile or moving of the automobile by a wrecker.

The prior art sensor illustrated in FIG. 7 has a piezo-electric element 8 adhered to a metal disc 7, which is a vibrating disc, and a weight 9 attached to the center of the piezo-electric element 8. By transforming the mechanical automobile body vibrations into an electrical output from the piezo-electric element 8, it is possible to detect theft, and the like, of the automobile.

Even in view of the prior art devices described above, there still exist problems in the art of automobile theft or tampering detection. For example, the problem of false theft detection (false alarms) has not been solved. Furthermore, various tamper related activities result in distinct automobile body vibration patterns. Prior art detectors are generally responsive to limited automobile body vibration patterns associated with a number of tampering activities, and are therefore not responsive to remaining activities.

The sensor illustrated in FIG. 5 has difficulty in responding to the vibration frequencies of various automobile bodies because its resonance frequency band is narrow and therefore the results of detection using this device vary widely among different automobiles. Consequently, the reliability of this device is very poor.

In the sensor illustrated by FIG. 6, the metal ball falls to one side of the base when the automobile is parked with the body tilted to one side, or when the automobile is parked on a hill. As a result, it becomes difficult for the metal ball to roll. Consequently, rocking or vibration of the automobile body, shock, or the insertion of a key into the keyhole cannot be sufficiently detected in these cases. Therefore, the reliability of this device is also poor.

Further, the sensor illustrated in FIG. 7 is wholly inadequate for theft detection purposes. Generally the piezo-electric element of FIG. 7 has a quiet resonance frequency of about 2 Khz. Thus, while the sensor responds easily to street noise, it is not responsive to rocking of the automobile body. Thus in use, this device is not suitable for detecting rocking and vibration of the automobile body associated with theft or tampering.

Other prior art sensors include those adapted to sense the lifting of the automobile by wreckers, jacks, and the like, with the use of rotary encoders and angle detection sensors. However, two or more of these rotary encoders or similar devices were required in order to detect vertical and lateral movement and shaking of the automobile body. Moreover, when the automobile is parked on an incline, the angle of incline must be recorded in a memory device, such that when a change in the angle of incline is detected, computation of the difference in tilt angle may be accurately computed. Thus requires the use of expensive microprocessors and special programming.

SUMMARY OF THE INVENTION

In view of the foregoing shortcomings, it is an object of the present invention to provide a highly sensitive sensor for detecting automobile theft, tampering, or the like, which is highly sensitive to noise phenomena typical of human mischief or theft, but which is not sensitive to external noise, such as emergency vehicle sirens, large noisy vehicles, or other external sound and noise.

In one aspect of the present invention, the automobile theft sensor comprises a piezo-electric element adhered at a first side thereof to a base member which is mounted on the automobile. The piezo-electric element produces an electrical output voltage corresponding to and in accordance with vibration of the automobile body. A weight is adhered to a second side of the piezo-electric element. A rubber coating covers at least a portion of the surface of the piezo-electric element and weight. A low-pass filter if provided for receiving the output voltage of the piezo-electric element and for providing an ultra low frequency output signal within the range of 1-5 Hz and a band-pass filter is provided for receiving the output voltage of the piezo-electric element and for providing a low frequency bandpass output signal having a center frequency within the range of 30-50 Hz.

The low-pass filter and band-pass filters divide the output voltage of the piezo-electric element into an ultra low frequency signal and a low frequency signal both of fixed bandwidth, and representative of the voltage produced by the piezo-electric element in response to the displacement of the metal weight and the rocking and vibration of the automobile body. When the voltage obtained in either of these frequency bands is higher than a predetermined level, the sensor will output an alarm signal indicating that there is theft by intrusion into the automobile compartment, or lifting of the automobile, a shock applied to the automobile, the insertion of a key into the keyhole, a shock/noise on the glass, and will prevent the output of an erroneous output signal caused by external noise.

Furthermore, since the piezo-electric element is not sensitive to temperature variations, it produces little pyroelectricity due to temperature change. Such inaccuracy is also diminished y coating the weight and the piezo-electric element with a silicon rubber.

DETAILED DESCRIPTION OF THE PREFERRED EMBODIMENT

Figure 1:
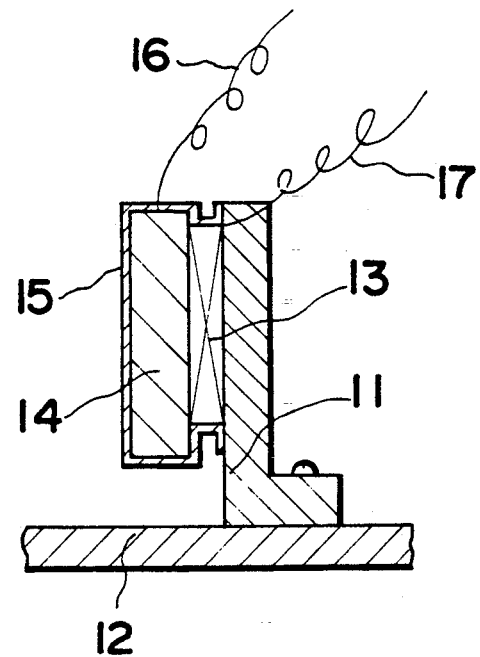
FIG. 1 is a cross-sectional view illustrating a preferred embodiment of the automobile theft sensor of the present invention.

The present invention shall be explained below based upon a description of a preferred embodiment as shown in the drawings, wherein like elements are denoted by the same reference numeral.

Referring to FIG. 1, there is seen a sensor for use in the theft detector of the present invention. In FIG. 1, reference numeral 11 designates a vertically standing base member, mounted on a bracket 12 which is installed on an automobile body. Reference numeral 13 designates a piezo-electric element, composed of, zirconate, for example, one side of which is adhered to the base member 11. In the event that electrodes are attached to the two opposing faces of the piezo-electric element 13 and polarized (in the up and down directions in the figure), voltage is generated when external power is applied to the electrical axis to create a parallel internal friction (when base 12 in the drawing vibrates in an up and down direction). Reference numeral 14 represents a metal weight which is adhered to the opposite side of the piezo-electric element 13. The metal weight 14 and piezo-electric element 13 are supported by the base member 11 in a detached position from the bracket 12.

Reference numeral 15 represents a silicon rubber coating, or the like, which most preferably covers the entire surface of the above mentioned piezo-electric element 13 and the weight 14, although the surface may be only partially covered. The rubber coating 15 prevents pyroelectricity from being produced by the sensor. An output lead wire 16 from the piezo-electric element 13 and a ground wire 17, both emanating from the piezo-electric element 13, are fed through the weight 14 and the base member 11.

Figure 2:
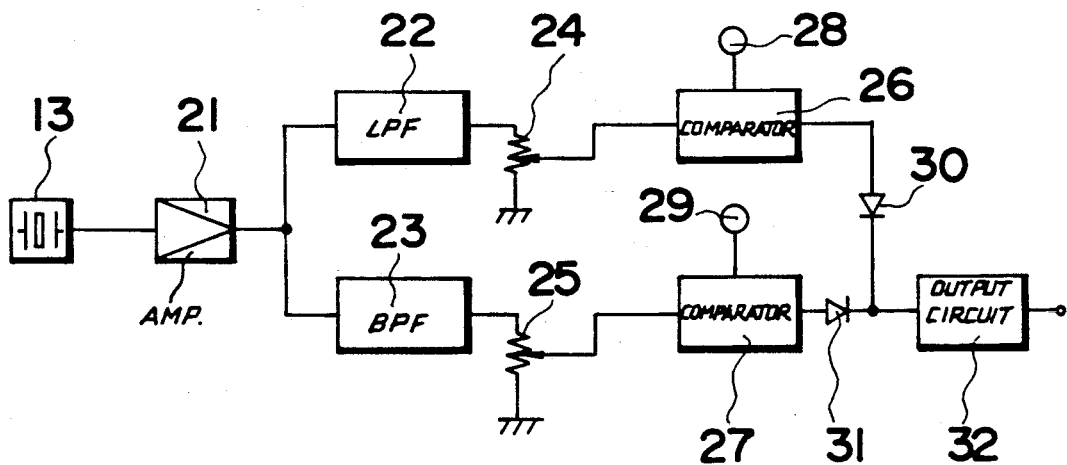
FIG. 2 is a block diagram of an electric circuit for use with the automobile theft sensor of FIG. 1 illustrating the rocking and vibration detection means of the present invention.
Figure 4:
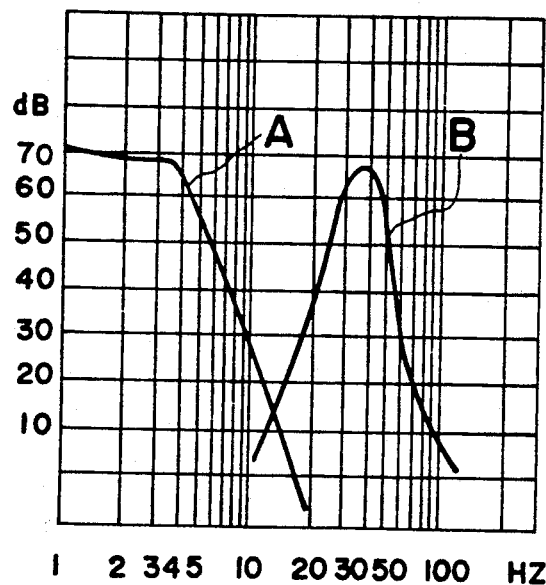
FIG. 4 is a graphical representation illustrating the frequency response of a low-pass filter and band-pass filter as illustrated in FIG. 2.
Figure 5:
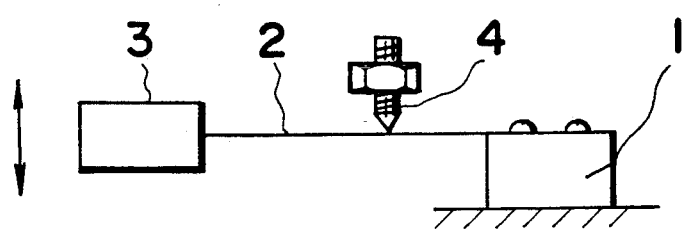
FIG. 5 is partial lateral view of a conventional automobile theft sensor.
Figure 6:
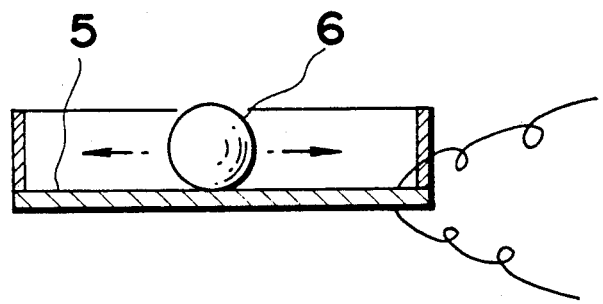
FIG. 6 is a cross-sectional view showing another example of a prior art automobile theft sensor.
Figure 7:
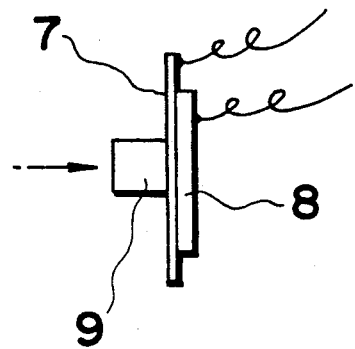
FIG. 7 is a cross-sectional view showing a further example of a prior art automobile theft sensor.

FIG. 2 is a block diagram of the rocking and vibration detection circuit according to the present invention. In FIG. 2, reference numeral 13 is the piezo-electric element of FIG. 1. An amplifier 21 acts as a conversion impedance and an output expander for the piezo-electric element 13. Reference numeral 22 denotes a low-pass filter 22 having the frequency response illustrated by A in FIG. 4, wherein an ultra low frequency signal of 1-5 Hz, or the vertical rocking frequency of an automobile body, is provided as an output of this amplifier 21. Reference numeral 23 is a band-pass filter having the frequency response illustrated by B of FIG. 4, passing a prescribed bandwidth signal centered at 30 to 50 Hz, which is the frequency of metallic noise due to a shock applied to the automobile body, or glass, and the noise of a key being inserted in a keyhole. Such filters are well known and most preferably consist of resistors and capacitors connected to single or multiple operation expanders, or amplifiers. Variable resistors 24, 25 provided at the output of the filters 22, 23, are used to adjust the output level of the low-pass filter 22 and the band-pass filter 23. Reference numerals 26 and 27 denote comparators used to determine whether the signal level of the above mentioned various frequency bands are higher than a predetermined value. LEDs 28 and 29 become illuminated when the above mentioned signal level exceeds the predetermined value. Diodes 30 and 31 form an OR gate, operating in such a manner that when a signal is produced by either of the comparators 26 or 27, the signal is input to an output electric circuit 32 comprising a transistor and the like and then provided to a siren or the like (not shown) to indicate that tampering has occurred.

Figure 3:
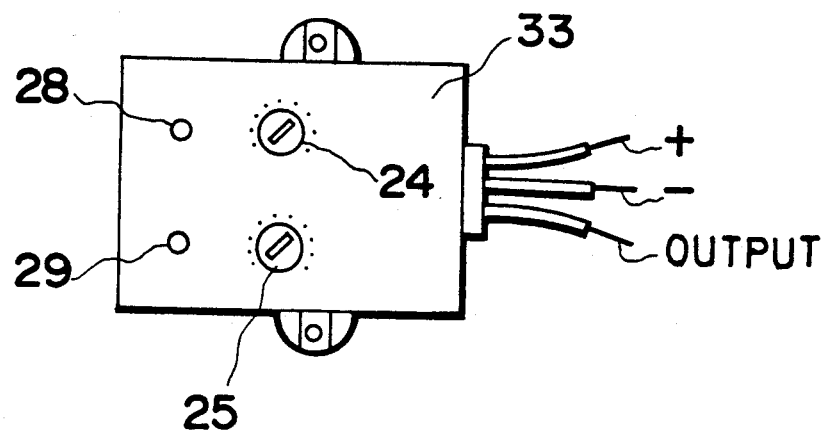
FIG. 3 is a partial front view of a housing for the circuit of FIG. 2.

FIG. 3 is a front view showing the housed construction of a rocking detection electric circuit. In FIG. 3, the variable resistors 24 and 25 and the LEDs 28 and 29 are facing the surface of display panel 33.

Next, the operation of the sensor and circuitry will be explained. When an automobile body is parked and subject to tampering, theft, or the like such as by the lifting up of the automobile body by a wrecker of a jack, or by a shock applied to the automobile body or window glass, breaking of the window glass, or by the insertion or pulling out of a key from a keyhole, the weight 14 which is supported on the base member 11 rocks or vibrates and a distorting power corresponding to the rocking and vibrating will be applied to the piezo-electric element 13. In response, the piezo-electric element 13 will produce a signal voltage having a frequency corresponding to the internal friction parallel to the electrical axis created by the rocking and/or vibration. This signal is input to the amplifier 21 shown in FIG. 2 and amplified. The signal is then input to the low-pass filter 22 and band-pass filter 23. Each of these filters 22 and 23 isolate and detect from each of the respective signals input thereto only the prescribed frequency band signals centered around 1-5 Hz and 30-50 Hz caused by the abnormal rocking and vibration of the automobile body. In the event that the signal output from either of the filters exceeds the predetermined level of the respective comparators 26 and 27, each of the LEDs 28 and 29 will light up and through each of the diodes 30 and 31 produce a signal indicating that the automobile body is rocking and is being robbed, or produce a signal indicating that the automobile body is being pounded on or the glass being hit and broken. This signal is provided to the output electric circuit 32 and is most preferably provided to an alarm siren (not shown). Therefore, by connecting an alarm or the like to this output electric circuit 32, from the rocking and vibrating of the automobile body a warning can be issued indicating that theft or tampering with the automobile is occurring.

As explained above, this invention comprises a piezo-electric element that is adhered to one side of a base member, which piezo-electric element generates a voltage in response to its internal friction parallel to the electrical axis; a weight adhered to and supported on the side of the piezo-electric element that is opposite the surface adhered to the base member; a silicon rubber coating covering at least a portion of the surface of the piezo-electric element and the weight; a low-pass filter for receiving the output signal of the piezo-electric element and for providing an ultra low frequency signal within the range of 1-5 Hz produced by the piezo-electric element in response to rocking of the automobile body; and a bandpass filter for receiving the output signal of the piezo-electric element and for providing a low frequency bandpass signal centered at 30-50 Hz that is produced by the piezo-electric element in response to other tampering activities. With the present invention, it is possible to reliably detect rocking and vibrating that affects the automobile body due to theft by screening out external noise such as sirens from emergency vehicles, the sounds and noise of other noisy vehicles, changes in ambient temperature, changes in light, and the like. Therefore, theft detection can be accomplished with precision and speed.

What is claimed is:

1. A sensor for detecting theft or tampering of an automobile comprising a piezo-electric element for producing an output voltage in response to vibrations of said automobile, said piezo-electric element having one side thereof attached to a rigid base member, said base member attached to the automobile body; a weight adhered to the opposite side of said piezo-electric element; a low-pass filter for receiving the output voltage of said piezo-electric element and for providing an ultra low frequency output signal within the range of 1-5 Hz, said ultra low frequency output signal corresponding to vibrations of said automobile body; a band-pass filter for receiving the output voltage of said piezo-electric element and for providing a low frequency bandpass output signal having a center frequency within the range of 30-50 Hz, said bandpass signal corresponding to vibrations of said automobile body; comparator means for receiving said ultra low frequency signal and said bandpass signal, comparing each with a predetermined value, respectively, and for providing an illuminating signal to an indicating means as well as an output signal to an output circuit when either of said ultra low frequency signal or said bandpass signal exceeds said predetermined value.

2. The sensor according to claim 1, wherein at least a portion of the surface of said piezo-electric element and said weight are covered with a rubber coating.

* * * * *